Jan. 27, 1959   A. DEMETRIADES   2,870,601
AUTOMATIC DIFFUSER CONTROL FOR AIR-BREATHING ENGINES
Filed March 14, 1955
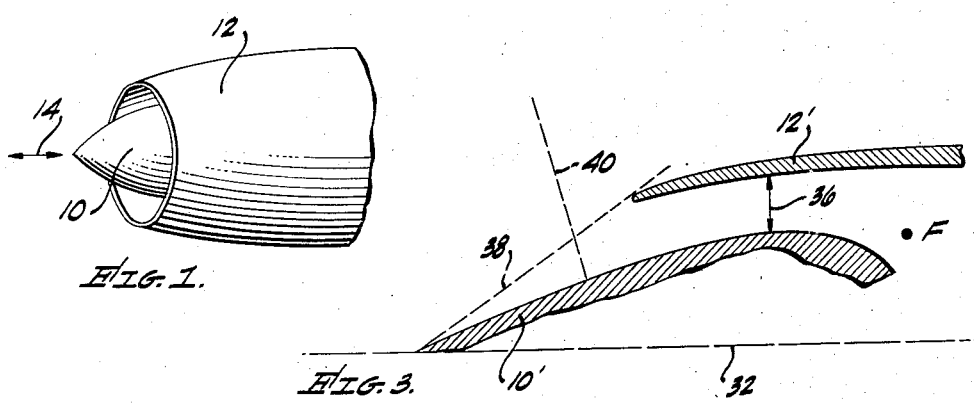
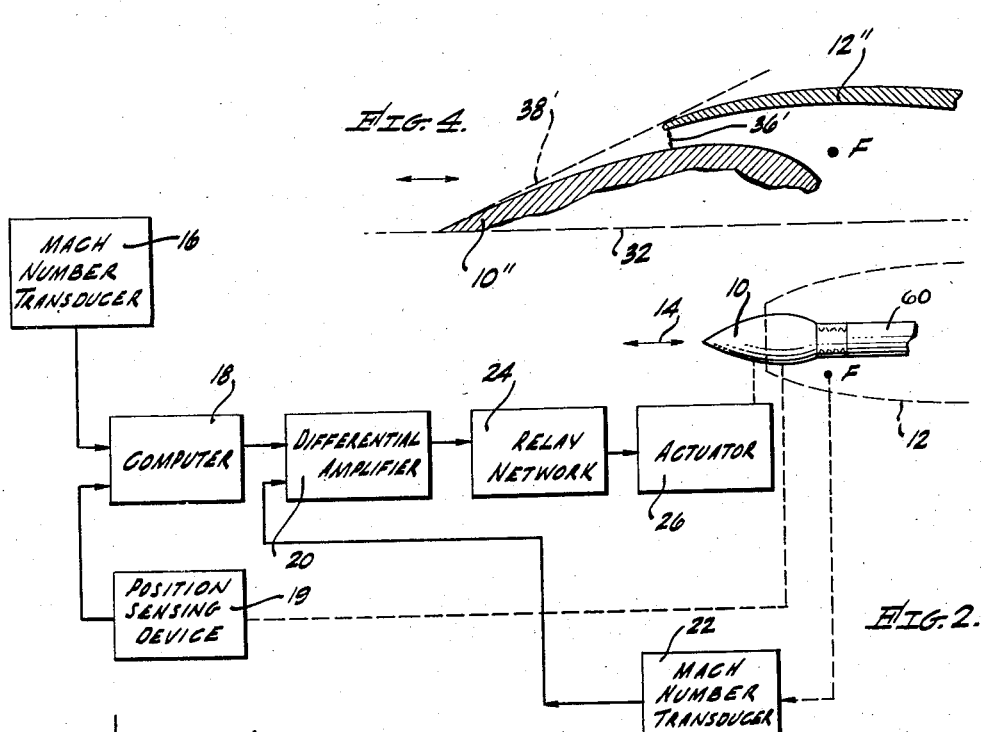
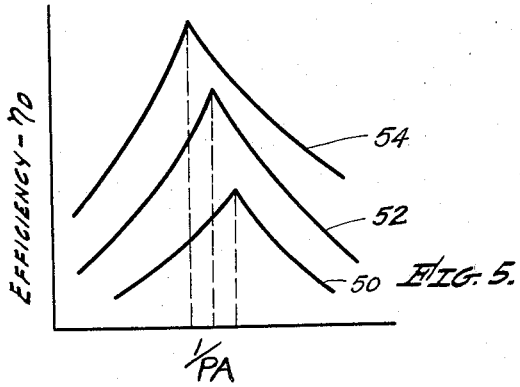
INVENTOR.
ANTHONY DEMETRIADES,
by Perry E. Turner
AGENT.

United States Patent Office 2,870,601
Patented Jan. 27, 1959

2,870,601

AUTOMATIC DIFFUSER CONTROL FOR AIR-BREATHING ENGINES

Anthony Demetriades, Pasadena, Calif., assignor to Lear, Incorporated, Santa Monica, Calif.

Application March 14, 1955, Serial No. 493,939

4 Claims. (Cl. 60—35.6)

This invention relates to air-breathing engines of the type used in aircraft flown as supersonic speeds, and more particularly to automatic control of inlet air for such an engine to effect its operation at maximum efficiency at any Mach number of flight.

It is well known that in an air-breathing power-plant for an aircraft flown at some given supersonic speed, the air pressure recovery needed for optimum thrust is obtained by means of a diffuser fixed at the entrance of the engine. With an arrangement known as the "spike diffuser," inlet air flows between the surface of a conical center-body and the inner surface of the cowling of the engine. Analysis and experience have shown that a fixed diffuser effects maximum efficiency of the engine at or near one speed only, and at one geometrical configuration of the diffuser. Therefore, a diffuser often has to be specially designed for an aircraft according to the Mach number at which it is intended to be flown most of the time.

It is a primary object of this invention to provide a means for automatically controlling the inlet air to an air-breathing engine for aircraft so that such engines will operate at maximum efficiency at any supersonic speed Mach number of flight.

It is another object of this invention to provide, for an air-breathing engine of a supersonic aircraft, an automatically variable diffuser to effect maximum pressure recovery and hence maximum efficiency of the engine at any speed of flight of the aircraft.

It is still another object of this invention to provide, for an air-breathing engine, a variable diffuser and an automatic control system to manipulate the diffuser and to control the inlet air so the engine will operate at maximum efficiency at substantially all supersonic speeds.

The above and other objects and advantages of this invention will become apparent from the following description taken in conjunction with the accompanying drawing, in which a preferred arrangement is illustrated by way of example. The scope of the invention is pointed out in the appended claims. In the drawing, Fig. 1 is a perspective view of the inlet end of an air-breathing aircraft engine provided with a variable diffuser, in accordance with this invention;

Fig. 2 is a block diagram to illustrate a suitable control system for automatic diffuser control, further in accordance with this invention;

Figs. 3 and 4 are section views of portions of the inlet end of aircraft engines provided with diffusers of different geometry, adapted for operation with the system of Fig. 2; and Fig. 5 is a series of curves to illustrate efficiency of operation of an aircraft engine having a diffuser which is automatically positioned by the system of Fig. 2.

Briefly, this invention comprises the measurement of the actual flight Mach number and the Mach number of air flow behind a diffuser "spike" within the cowling of the engine. Signals are derived which represent the present position of the spike and the two Mach numbers, and this signal information is correlated to develop a control signal which represents the optimum position for the spike. Finally, the spike is moved to a position in response to the control signal.

Referring to Fig. 1, an aircraft of the air-breathing type is illustrated with a conoidal diffuser element or "spike" 10 located within the mouth of the cowling 12 of an engine. Spike 10 is adapted for axial movement within the mouth of the cowling 12, as indicated at 14. For the purpose of this invention, spike 10 is movable to permit it to be located at the best position for any given speed of flight which will admit air flow to the engine for maximum operating efficiency.

A suitable system to control the position of diffuser spike 10 is illustrated in Fig. 2. Referring to Fig. 2, a Mach member transducer 16 is adapted to supply signals to a computer 18. A position pickoff or sensing device 19 is adapted to effect a signal input to the computer which represents the position of the spike 10 within the cowling 12. The computer 18 is coupled to a differential amplifier 20, along with the output of a Mach-number transducer 22. Signals from the differential amplifier 20 are applied to a relay network 24, and a diffuser actuator 26 mechanically coupled to spike 10 is adapted to receive signals from relay network 24.

The operation of the above described system will now be explained.

Transducer 16 develops a signal which represents the actual flight Mach number. Computer 18 develops a signal which bears a predetermined functional relation to the combination of the signals representing the actual flight Mach number and the position of spike 10. The output of this computer is a signal which represents the Mach number which should exist at a point F within the diffuser if the geometry had the desired setting. Mach number transducer 22 develops a signal which represents the Mach number of the air flow at point F. The differential amplifier 20 therefore effectively responds to an error signal representing the difference between the signals from computer 18 and transducer 22 to apply a command or control signal to the relay network 24.

Relay network 24 may be a conventional polarity-sensitive switching circuit adapted to translate signals to its output which correspond to the polarity of the input signals. Actuator 26 is a suitable electro-mechanical device to move spike 10 in a direction depending upon the polarity of the signals from the relay network. If the position of spike 10 is the proper one for the particular speed of flight, the comparison of the outputs of computer 18 and transducer 22 results in a zero output from differential amplifier 20 and relay network 24.

Mach-number transducers 16 and 22 are conventional and may, for example, be of the type illustrated and described in the publication, "Kollsman Aircraft Instruments" (published by Kollsman Instrument Corporation, 1954). Computer 18 may comprise conventional function generators adapted to develop a signal output which bears a desired functional relation to two input signals, examples of which may be found in the publication, "Electronic Analog Computers" by G. A. Korn and T. M. Korn (McGraw-Hill Book Co., New York, N. Y.). The position pickoff device 19 may be a potentiometer device having its sliding arm mechanically coupled to spike 10 and movable with the diffuser to cause a signal representative of its position to be applied to computer 18.

If the actual flight Mach number is designated $M_1$, and the signal due to positioning of pickoff 19 is designated as $x$, computer 18 develops a signal $f(x, M_1)$ which represents the optimum Mach number $(M_F)_0$, for air flow behind the diffuser. This may be expressed as $$(M_F)_0 = f(x, M_1) \tag{I}$$

where $M_F$ represents the Mach number at location F. Transducer 22 applies a signal to differential amplifier 20 which represents $M_F$. The output of amplifier 20 is a signal which has a magnitude representing the difference between the magnitudes of the input signals thereto and a polarity corresponding to the polarity of the greater of the two signals. Accordingly, relay network 24 will effect operation of actuator 26 to move spike 10 in the proper direction and through the proper distance, as previously explained. If the signals from computer 18 and transducer 22 are identical in magnitude and of opposite polarity, the command signal will, of course, be zero.

To further aid in understanding this invention, reference will be made to Figs. 3 and 4, which illustrate different geometric relations of diffusers in air-breathing engines. Referring to Fig. 3, sections of a spike 10' and cowling 12' are shown on one side of a common axis 32. In this case, the geometric arrangement is such that the minimum area, i. e., the diffuser throat, is behind the cowling lip, as indicated at 36. The arrangement is also such that for limited axial movement of the spike in either direction, the area at 36 will increase but will still be the smallest area within the cowling. It is well known that in this case, inlet air is admitted to the engine with maximum efficiency if the existing normal shock wave stands at the diffuser throat, because the diffuser throat is the point at which maximum pressure recovery across the plane of the normal shock wave can be realized.

The location of the normal shock wave is also influenced by the conical shock waves, indicated at 38, and back pressure at the inner end of the diffuser. If the spike were stationary, these effects would combine at the optimum speed to locate the normal shock wave at the diffuser throat. If flight conditions change, as by changes in engine scheduling which vary the back pressure, and changes in speed, the normal shock will move away from the diffuser throat and less efficient admission of air to the engine will result. At speeds well below the optimum speed the diffuser throat will be choked sufficiently to cause a normal shock wave to stand in front of the cowling inlet, as indicated at 40. As the optimum speed is approached the normal shock wave will stand between the cowling lip and the diffuser throat, and at speeds greater than the optimum the normal shock wave will move inwardly past the throat. In accordance with this invention, the diffuser would be moved in the direction and through the distance necessary to maintain the normal shock wave at the same location, i. e., the diffuser throat. In this manner, inlet air is admitted to the engine with maximum efficiency over a wide range of speeds.

Referring to Fig. 4, the throat of the diffuser formed by spike 10" and cowling 12", as indicated at 36' that is, the inlet area and the diffuser throat area coincide, and the geometry is such that this condition will be maintained for limited axial movement of the spike. For an arrangement of this type, automatic control in accordance with this invention causes the spike to be positioned to maintain the normal shock wave at the cowling lip for a wide range of speeds.

Fig. 5 illustrates typically the efficiency variation for different positions of a diffuser spike. Curves 50, 52 and 54 illustrate plots of $$\eta_D V \cdot \frac{1}{PA}$$

for successively greater Mach numbers, where $\eta_D$=engine efficiency, $P$=back pressure and $A$=diffuser throat area. It will be observed that for each Mach number there exists a point of maximum efficiency, and the curve falls off rapidly on either side of this critical point. If, for example, the spike is located so that inlet air is admitted to the engine with maximum efficiency for curve 52, and a change in flight conditions causes the normal shock to stand in front of the diffuser throat, as in front of the inlet of Fig. 4, the Mach number transducers (Fig. 2) will develop signals representing the changed flight Mach number and Mach number at point F, and the spike will be moved in response to the resultant command signal until the normal shock wave again stands at the diffuser throat. If the change in flight conditions reflects a lower Mach number, the new position of the spike will effect admission of inlet air to the engine at maximum efficiency for the lower Mach number, such as is indicated on curve 50 of Fig. 5.

The diffuser spike may be adapted for movement in any suitable manner. For example, and as indicated in Fig. 2, the spike may be threadedly supported on the end of a support rod or member 60 which extends through the center of the cowling 12. In such an arrangement the spike is rotated to effect axial movement thereof. Obviously, spike 10 could also be arranged in slidable engagement with rod 60 and moved under control of the actuator.

It will be apparent from the foregoing that a new method and means has been developed whereby an air-breathing engine for aircraft is enabled to operate at maximum efficiency by the provision of a movable center body which is positioned within the cowling of the engine in response to control signals resulting from a comparison of the actual flight Mach number and the Mach number of air flow within the cowling.

What is claimed is:

1. In aircraft for flight at supersonic speeds, in combination with an air-breathing engine to receive air through the mouth of a cowling, a movable center body to form with said cowling a diffuser for air entering the mouth of the cowling, the geometric arrangement of said center body and said cowling permitting a minimum diffuser throat area to be maintained at a predetermined point from the mouth of the cowling during limited movement of said center body, a first Mach number transducer to develop an output signal representing the actual flight Mach number for the aircraft, position sensing means to establish a signal representing the instant position of said center body within said cowling, means responsive to the signals from said first transducer and said position sensing means to develop a function signal which represents a desired Mach number for air flow within the interior of the cowling behind the diffuser throat at said actual flight Mach number, a second Mach number transducer to develop a signal representative of the instant Mach number of the air flow within the interior of the cowling behind the diffuser throat, means responsive to the output signals from said second transducer and said function signal developing means to develop a control signal, and actuating means to move said center body in accordance with the polarity and magnitude of said control signal to the position at which said desired Mach number exists for air flow within the cowling behind the diffuser throat.

2. In combination, in an air-breathing engine for supersonic aircraft, a cowling for said engine having an entrance to receive inlet air, a length of movable spike centered at the entrance of said cowling, said spike and said cowling providing a supersonic diffuser for the inlet air, said spike having a geometry which effects maintenance of a minimum diffuser throat area at a predetermined point from said entrance for limited axial movement of said spike, respective means to develop signals representing the instant position of said spike and the Mach numbers of air flow at opposite ends of said spike, means responsive to said signals to develop a control signal representative of the optimum position of said spike at which maximum operating efficiency of the engine will be effected at the instant speed of the aircraft, and means for moving said spike to said optimum position in response to said control signal.

3. In combination with an air-breathing engine for aircraft flown at supersonic speeds, wherein air is admitted to the engine through the mouth of a cowling, a movable element centered at the mouth of the cowling, said element and said cowling forming a diffuser, said element being geometrically arranged within said cowling to permit a minimum diffuser throat area within the cowling to be maintained at a predetermined point for limited movement of said element, said element having first and second positions at first and second Mach numbers to provide respective minimum throat areas at said predetermined point at which the Mach number of air flow behind said element is of a magnitude to effect admission of air to the engine at maximum efficiency, said element being located in said first position during flight at said first Mach number, first means operable upon change in flight speed to said second Mach number to develop an output signal representing said second Mach number, position sensing means for developing a signal which represents said first position of said element, second means to develop a signal which bears a predetermined functional relation to the signals from said first means and said position sensing means, third means to develop a signal representative of the Mach number of the air flow at the interior of the cowling behind the diffuser throat, means to compare the output signals from said second and third means and to develop a control signal which represents their difference, and means to move said element to said second position in response to said control signal.

4. In a supersonic aircraft having an air-breathing engine to which air is admitted through a cowling, a center body centrally located at the entrance of the cowling and extending partially to the exterior of the cowling, said center body being symmetric with respect to and adapted for limited movement along the axis of the cowling, said center body being dimensioned to maintain throughout said limited movement a minimum area at a predetermined point measured from the entrance of the cowling, means to develop a signal representing the actual flight Mach number, means to develop a signal representing the Mach number of air flow within the cowling and behind said predetermined point, means to compare the position of said center body and the signals and to develop a command signal which represents the position of said center body to provide the minimum area through which air will be admitted to the engine with maximum efficiency, an actuator mechanically coupled to said center body and responsive to said command signal to move said center body along said axis to effect admission of air at maximum efficiency.

References Cited in the file of this patent

UNITED STATES PATENTS

| | | |
|---|---|---|
| 2,540,594 | Price | Feb. 6, 1951 |
| 2,638,738 | Salter | May 19, 1953 |